(12) United States Patent
Soemoto et al.

(10) Patent No.: US 11,911,810 B2
(45) Date of Patent: Feb. 27, 2024

(54) CLEANER

(71) Applicant: TAKUSYO CO., LTD., Takatsuki (JP)

(72) Inventors: Kazuhiko Soemoto, Osaka (JP); Hiroshi Uzawa, Izumi (JP)

(73) Assignee: TAKUSYO CO., LTD., Takatsuki (JP)

( * ) Notice: Subject to any disclaimer, the term of this patent is extended or adjusted under 35 U.S.C. 154(b) by 359 days.

(21) Appl. No.: 17/073,768

(22) Filed: Oct. 19, 2020

(65) Prior Publication Data

US 2022/0001425 A1 Jan. 6, 2022

(30) Foreign Application Priority Data

Jul. 1, 2020 (JP) ................................ 2020-113741

(51) Int. Cl.
*B08B 5/02* (2006.01)
*B08B 13/00* (2006.01)
*B33Y 80/00* (2015.01)

(52) U.S. Cl.
CPC ............... *B08B 5/02* (2013.01); *B08B 13/00* (2013.01); *B33Y 80/00* (2014.12)

(58) Field of Classification Search
CPC . A47L 9/08; A47L 9/0693; B08B 5/00; B08B 5/02; B08B 5/023; B08B 5/04; B08B 13/00; B08B 3/00; B08B 3/12; B33Y 80/00

USPC .................................................. 15/345, 405
See application file for complete search history.

(56) References Cited

U.S. PATENT DOCUMENTS

2017/0036252 A1\* 2/2017 De Dea ............... G03F 7/70925
2021/0022583 A1\* 1/2021 Jung ......................... F25B 1/00

FOREIGN PATENT DOCUMENTS

CN 109127520 A * 1/2019 ............... B08B 1/02
JP H05-80573 U 11/1993

OTHER PUBLICATIONS

CN-109127520 Machine Translation (Year: 2019).\*

\* cited by examiner

*Primary Examiner* — Lee D Wilson
*Assistant Examiner* — Alberto Saenz
(74) *Attorney, Agent, or Firm* — Kratz, Quintos & Hanson, LLP

(57) ABSTRACT

A cleaner to conduct dust-removing by jetting air from a dust-removing head 1 to a cleaned face 11 of a work W having the cleaned face 11 of three-dimensional configuration, in which the dust-removing head 1 is provided with a work-corresponding face 1*a* of three-dimensional offset configuration parted from the three-dimensional configuration of the cleaned face 11 for a small dimension G.

4 Claims, 3 Drawing Sheets

CLEANER

1. FIELD OF THE INVENTION

This invention relates to a cleaner.

2. DESCRIPTION OF THE RELATED ART

Conventionally, a cleaner for removing dust on surface of product (work) which needs dust removal, provided with an air jetting nozzle and a suction nozzle, is known (refer to Japanese Utility Model Publication No. H5.80573).

However, the conventional cleaner disclosed by Japanese Utility Model Publication No. H5-80573 is for dust removal of leaves of flat work, and can't correspond to solid (three-dimensional) work, namely, three-dimensional products such as diving goggles, optical lenses, Petri dishes for experiment, etc. And, even in case that the cleaner is customized to correspond to the three-dimensional work, gaps between parts of the work and a dust-removing head greatly vary, and dust removal on curved portions of the work is insufficient. Especially, dust removal becomes more difficult for complicated concave, convex, or concave-convex three-dimensional work.

Therefore, it is an object of the present invention to provide a cleaner, corresponding to three-dimensional work, which can blow air to each part of the work, and effectively remove the dust on cleaned faces of the three-dimensional work.

BRIEF DESCRIPTION OF THE DRAWINGS

The present invention will be described with reference to the accompanying drawings, in which.

DESCRIPTION OF THE PREFERRED EMBODIMENTS

Preferred embodiments of the present invention will now be described with reference to the accompanying drawings.

Figure 1:
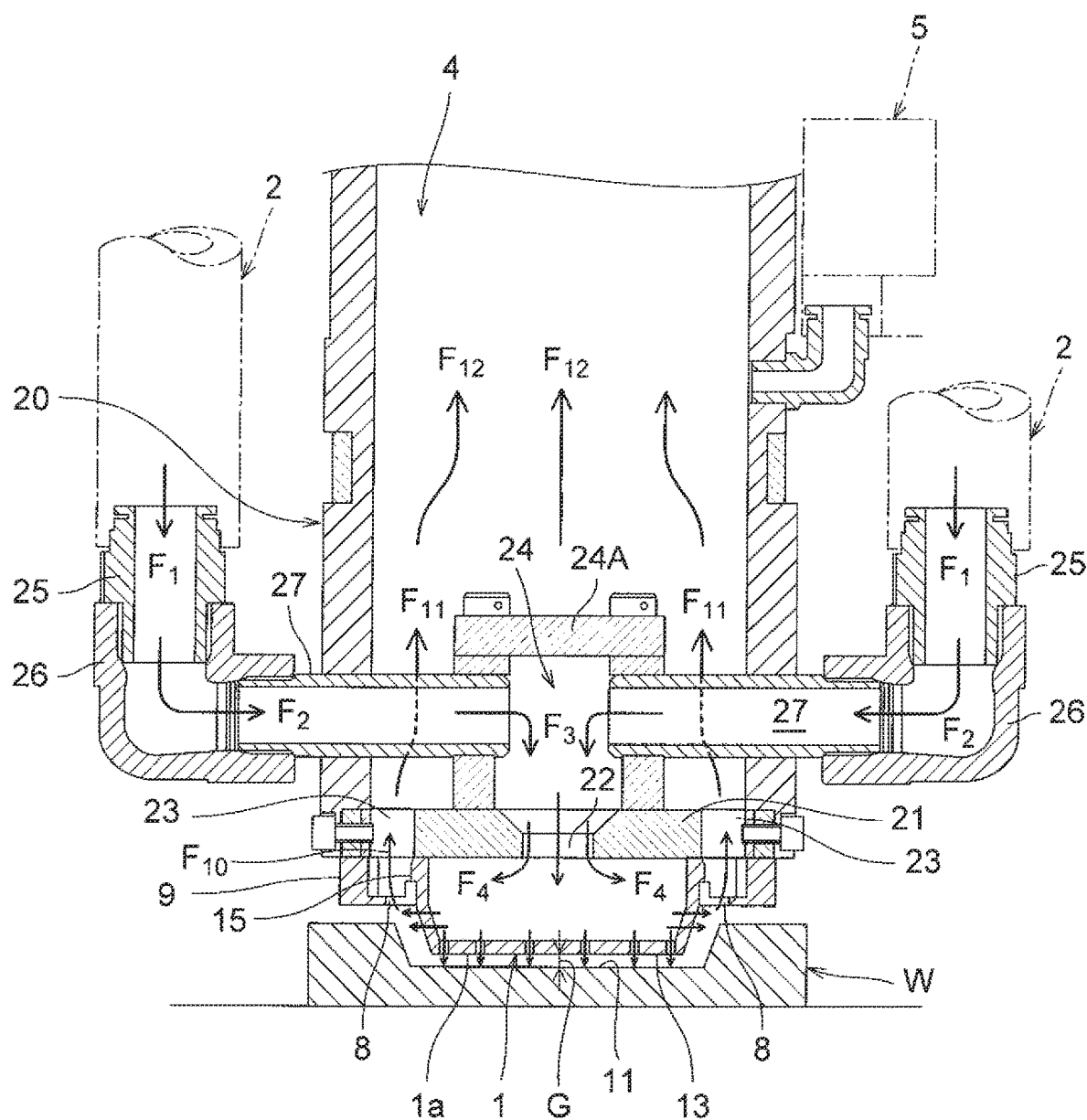
FIG. 1 is an entire cross-sectional view showing an embodiment of the present invention.
Figure 2:
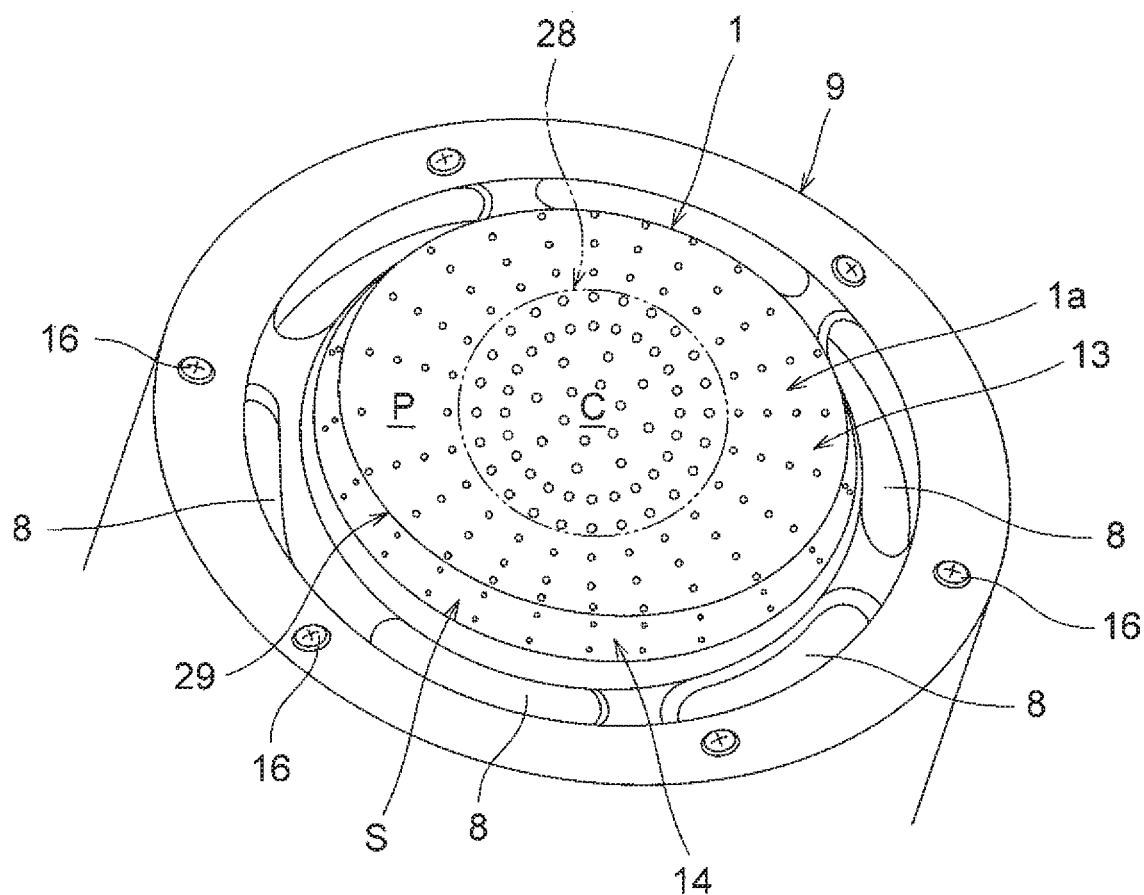
FIG. 2 is a perspective view observed from a bottom face side showing an example of a dust-removing head.
Figure 3:
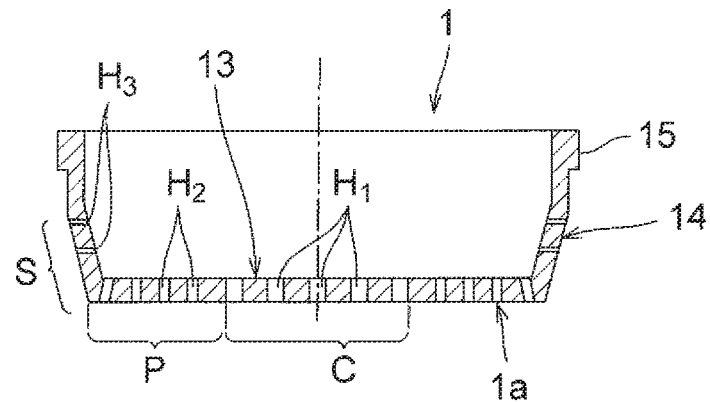
FIG. 3 is a cross-sectional view of the dust-removing head.

In FIG. 1, FIG. 2, and FIG. 3, a mark 1 represents a dust-removing head to jet air against a cleaned face 11 of concave three-dimensional configuration of a work W to make dust-removing function.

The dust-removing head 1 is provided with a work-corresponding face 1a of convex three-dimensional offset configuration parted from the cleaned face 11 of concave three-dimensional configuration of the work W for a small dimension G.

And, it is desirable to make the dust-removing head 1 shown in FIG. 1 through FIG. 3 with metal 3-D printer. The concrete configuration is based on 3-D data in which the concave three-dimensional configuration of the cleaned face 11 of the work W is recorded, the three-dimensional offset configuration offset for the small dimension G is calculated, and the metal 3-D printer is controlled by the calculation result to form the work-corresponding face 1a of slightly small convex to produce the dust-removing head 1 with a predetermined thickness.

Further, to explain the dust-removing head 1 shown in FIG. 1 through FIG. 3 concretely, the dust-removing head 1 is composed as one unit of an elliptic or ellipsoidal bottom wall portion 13, a peripheral wall portion 14 enlarging upward, and a low brim portion 15 formed protruding from an upper end edge of the peripheral wall portion 14 in outward direction.

In FIG. 1, the dust-removing head 1 is fixed to a lower end of an air-jet and suction cylindrical body 20 through an attachment ring 9 having plural arc-shaped air suction holes 8. Or, it is also desirable to form the attachment ring 9 with the dust-removing head 1 as one unit. FIG. 2 shows an embodiment (example) of the unit.

Hitching the brim portion 15 from a lower side, the attachment ring 9 is mounted to the dust-removing head 1, and fixed to a bottom wall plate 21 on the lower end of the air-jet and suction cylindrical body 20 with bolts (screws) 16.

The bottom wall plate 21, having a discharge hole 22 on the center and plural suction holes 23 along a peripheral edge, is assembled to be connected to the air suction holes 8 of the attachment ring 9.

A mark 4 represents an air suction cylinder portion (of large diameter), and the bottom wall plate 21 is fixed to a lower end face of the air suction cylinder portion 4. Further, a discharged air concentration box 24 with a ceiling plate 24A is fixed to an upper face of the bottom wall plate 21.

A mark 2 represents an air supply pipe to supply high-pressurized air sent from a compressor etc. not shown in figures, and the air supply pipe 2 is communicatively connected to peripheral wall portions of the discharged air concentration box 24 through various joints 25, 26, and 27.

Arrows $F_1$, $F_2$, $F_3$, and $F_a$ serially show the high-pressurized air flow from the air supply pipe 2 sent into the dust-removing head 1.

On the other hand, the air sucked by the air suction holes 8 of the attachment ring 9, as shown with arrows $F_{10}$, $F_{11}$, and $F_{12}$, is sucked in ascending direction in the air suction cylinder portion 4 through a suction hole 23. A mark 5 represents a suction pressure measuring device. As described above, surrounding area (apparatus) is not polluted because the air is sucked from the periphery through the air suction holes 8.

And, in FIG. 2 and FIG. 3, when the bottom wall portion 13 of the work-corresponding face 1a of the dust-removing head 1 is imaginarily divided into a center area C and a middle surrounding area P as shown with a two-dot broken line 28, further, imaginarily divided into the middle surrounding area P and an outside surrounding area S with a ridge line 29, diameter of air-jetting hole is set to become smaller serially for the areas C, P, and S.

In other words, when diameter of a first air-jetting hole $H_1$ on the imaginarily divided center area C is $D_1$, diameter of a second air-jetting hole $H_2$ on the middle surrounding area P is $D_2$, and diameter of a third air-jetting hole $H_3$ on the outside surrounding area S is $D_3$, an inequality $D_1 > D_2 > D_3$ is fulfilled.

As described above, with the setting of the diameter serially smaller for the areas C, P, and S, the air flowing through the gap of the small dimension G shown in FIG. 1 smoothly flows out of the center area C in radial outer direction, certainly sucked by the air suction hole 8 in the arrow $F_{10}$ direction, and dust stuck on the cleaned face 11 can be swiftly and certainly removed.

Figure 4:
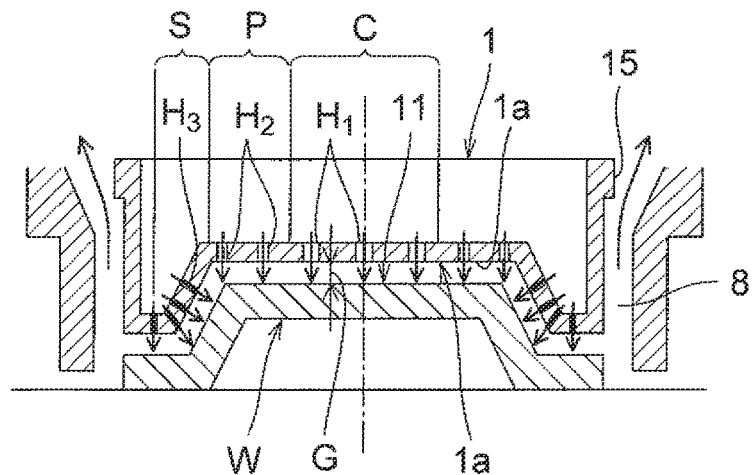
FIG. 4 is a cross-sectional view of a principal portion in used state showing another embodiment.

Next, FIG. 4 shows another embodiment. The work W has a convex and three-dimensional cleaned face 11. The dust-removing head 1 has a work-corresponding face 1a of concave three-dimensional offset configuration parted from the cleaned face 11 for a predetermined small dimension G.

Also in the case of FIG. 4, it is desirable to make the dust removing head 1 with metal 3-D printer.

The three-dimensional configuration of the convex cleaned face 11 and the concave work-corresponding face 1a is (although not shown in figures) one of various configurations such as elliptic, ellipsoidal, square, hexagonal, octagonal, etc.

And, also in FIG. 4, in case of the imaginary division of the center area C, the middle surrounding area P, and the outside surrounding area S, the diameter of the air jetting hole is set to become serially smaller. That is to say, the diameter of the air jetting hole is set as to fulfill the above inequality $D_1>D_2>D_3$, the air flowing through the gap of the small dimension G smoothly flows out of the center area C in radial outer direction, then, sucked by the air suction hole 8 disposed along the peripheral face of the dust-removing head 1. As described above, certain and smooth dust removal can be realized. And, surrounding area is not polluted because of the suction by the air suction holes 8 on the periphery.

Figure 5:
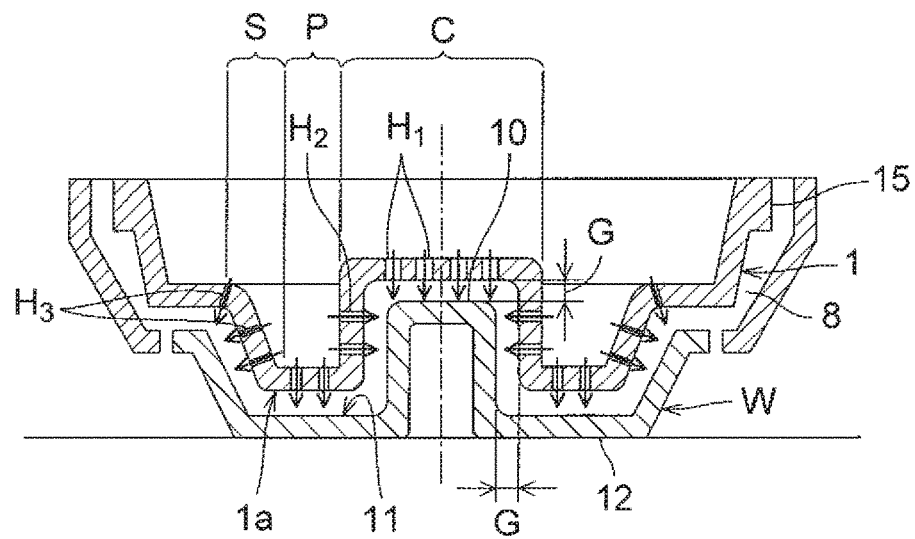
FIG. 5 is a cross-sectional view of a principal portion in used state showing still another embodiment.

Next, FIG. 5 shows still another embodiment of the present invention. The work W, having a cleaned face 11 of concave-convex three-dimensional configuration, is shown. The dust-removing head 1 has a work-corresponding face 1a of convex-concave three-dimensional offset configuration parted from the concave-convex cleaned face 11 for a predetermined small dimension G.

Also in the case of FIG. 5, it is desirable to make the dust-removing head 1 with metal 3-D printer.

Further, although FIG. 5 shows the work W concave-convex having a convex protruding portion 10 on the center of the bottom wall 12, this may be concave-convex forming a concave portion on the center area C on the above-described convex cleaned face 11 as shown in FIG. 4 (not shown in figures).

In FIG. 5, in case of the imaginary division of the center area C, the middle surrounding area P, and the outside surrounding area S, the diameter of the air jetting hole is set to become serially smaller. That is to say, as described with FIG. 1 through FIG. 3, the diameter of the air jetting hole is set as to fulfill the above inequality $D_1>D_2>D_3$, the air flowing through the gap of the small dimension G smoothly flows out of the center area C in radial outer direction, and uniform and sufficient dust removal can be certainly realized against the complicated three-dimensional cleaned face 11. And, also in the case of FIG. 5, the air suction holes 8 are disposed on the periphery to prevent pollution of surrounding area.

The dust-removing efficiency can be improved further by supersonic wave generated by flowing the air from the large space of the discharged air concentration box 24 to the large space of the dust-removing head 1 as shown with the arrows $F_4$ through the small discharge hole 22 as shown in FIG. 1 (also similar in FIG. 4 and FIG. 5).

In any case of FIG. 1 through FIG. 5, the gap of the small dimension G is formed approximately uniform between the work-corresponding face 1a of the dust-removing head 1 and the cleaned face 11 of the work W, and the small dimension G is desirably 1 mm to 3 mm.

When G<1 mm, the work-corresponding face 1a may contact the work W. And, when G>3 mm, dust-removing effect is decreased.

As shown in FIG. 1, the air is sent from the air supply pipe 2 as shown with the arrows $F_1$, $F_2$, and $F_3$, once concentrated in the discharged air concentration box 24, then, sent from the discharge hole 22 into the upper space portion 1c of the dust-removing head 1 as shown with the arrows $F_4$, and, jetted from the air-jetting holes $H_1$, $H_2$, and $H_3$ toward the cleaned face 11 of the work W to remove even micro dust efficiently and uniformly.

The air-jetting pressure is preferably selected (set) within a range of 0.1 MPa to 0.3 MPa.

A customer sends 3-D data in which the three-dimensional configuration of the cleaned face 11 of the product to be dust-removed is recorded, the three-dimensional offset configuration of the work-corresponding face 1a of the dust-removing head 1 is calculated based on the 3-D data, and the metal 3-D printer is controlled by the calculation result to form the work-corresponding face 1a. By this method, the work-corresponding face 1a of the dust-removing head 1 is formed with the three-dimensional offset configuration and dimension accurately to the three-dimensional configuration of the cleaned face 11 of the product to be dust-removed. The most appropriate kind of the metal 3-D printer, considering the three-dimensional configuration, dimensional accuracy, etc. of the cleaned face 11 of the product to be dust-removed, can be selected from selective laser sintering (SLS), direct metal laser sintering (DMLS), etc.

As described above, the diameter of the air-jetting hole H is changed for each imaginary areas of the center area C, the middle surrounding area P, and the outside surrounding area S, concretely, the diameter of the first air-jetting hole $H_1$ in the center area C is 0.95 mm to 1.05 mm, the diameter of the second air-jetting hole $H_2$ in the middle surrounding area P is 0.75 mm to 0.85 mm, and the diameter of the third air-jetting hole $H_3$ in the outside surrounding area S is 0.55 mm to 0.65 mm. With this construction, the air flow does not stay between the work-corresponding face 1a and the cleaned face 11, and dust can be smoothly sent into the air suction hole 8 because the more distant from the air suction hole 8, larger the amount of the air flow.

In the present invention, which is modifiable, for example, it is also desirable to form the work-corresponding face 1a by resin 3-D printer in some cases.

The present invention, as described above in detail, can jet air uniformly to every corner of the cleaned face 11 (of the work W) of complicated three-dimensional configuration conventionally regarded as very difficult for dust removal, and effective and sufficient dust removal can be conducted because the cleaner has the dust-removing head 1 to jet air to the cleaned face 11 of the work W having the cleaned face 11 of three-dimensional configuration such as concave, convex, or concave-convex, and the dust-removing head 1 is provided with the work-corresponding face 1a of convex, concave, or convex-concave three-dimensional offset configuration parted from the three-dimensional configuration of the cleaned face 11 for the small dimension G.

And, the work corresponding face 1a can be formed with high accuracy (by metal 3-D printer) in case that the configurations of the fine parts of the work W are complicated concave, convex, or concave-convex because the dust-removing head 1 is formed by the metal 3-D printer.

And, receiving 3-D data of the configuration of the cleaned face 11 of customer's demand, the dust-removing head 1 corresponding to individual customer's demand can be produced with high accuracy within a short delivery term because the three-dimensional offset configuration of the work-corresponding face 1a of the dust-removing head 1 is calculated based on 3-D data in which the three-dimensional configuration of the cleaned face 11 is recorded, and the work-corresponding face 1a is formed by the metal 3-D printer controlled by the calculation result.

And, the compressed air is sufficiently and strongly jetted to the center area C distant from the air suction hole 8 (the air flow is prevented from staying on the center area C) to remove the dust, and the entire face of the cleaned face 11 of the work W can be uniformly and sufficiently dust-removed because the work corresponding face 1a of the dust-removing head 1 is imaginarily divided into three areas of the center area C, the middle surrounding area P, and the outside surrounding area S, and, when diameter of the first air-jetting hole $H_1$ on the center area C is $D_1$, diameter of the second air-jetting hole $H_2$, on the middle surrounding area P is $D_2$, and diameter of the third air-jetting hole $H_3$ on the outside surrounding area S is $D_3$, the inequality $D_1 > D_2 > D_3$ is fulfilled.

While preferred embodiments of the present invention have been described in this specification, it is to be understood that the invention is illustrative and not restrictive, because various changes are possible within the spirit and indispensable features.

What is claimed is:

1. A cleaner, comprising a dust-removing head,
    wherein the dust-removing head has a work-corresponding face of convex, concave, or convex-concave three-dimensional configuration,
    wherein the dust-removing head jets air to a cleaned face of a work having the cleaned face of a three-dimensional configuration of concave, convex, or concave-convex,
    wherein the configuration of the work-corresponding face of the dust-removing head corresponds to and is separated from, by a proximate distance, the configuration of the cleaned face of the work, and
    wherein the work-corresponding face of the dust-removing head comprises a plurality of different surface areas with respective air jetting holes of differing diameter sizes, and
    wherein the different surface areas are located at different distances from the longitudinal axis along which the dust-removing head extends, each of the different surface areas having air jetting holes with diameters that are different from diameters of other air jetting holes of another one of the different surface areas.

2. The cleaner as set forth in claim 1, wherein the dust-removing head is formed by a metal 3-D printer.

3. The cleaner as set forth in claim 2, wherein the three-dimensional offset configuration of the work corresponding face of the dust-removing head is calculated based on 3-D data in which the three-dimensional configuration of the cleaned face is recorded, and the work-corresponding face is formed by the metal 3D printer controlled by a calculation result.

4. The cleaner as set forth in claim 1,
    wherein the work-corresponding face of the dust-removing head is imaginarily divided into three areas of a center area, a middle surrounding area, and an outside surrounding area, and
    wherein a diameter of a first air-jetting hole on the center area is $D_1$, a diameter of a second air-jetting hole on the middle surrounding area is $D_2$, and a diameter of a third air-jetting hole on the outside surrounding area is $D_3$, an inequality $D_1 > D_2 > D_3 >$ is filled.

* * * * *